US009292797B2

(12) United States Patent
He et al.

(10) Patent No.: US 9,292,797 B2
(45) Date of Patent: Mar. 22, 2016

(54) SEMI-SUPERVISED DATA INTEGRATION MODEL FOR NAMED ENTITY CLASSIFICATION

(71) Applicant: International Business Machines Corporation, Armonk, NY (US)

(72) Inventors: Qi He, San Jose, CA (US); W. Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 13/714,667

(22) Filed: Dec. 14, 2012

(65) Prior Publication Data

US 2014/0172754 A1  Jun. 19, 2014

(51) Int. Cl.
G06F 15/18 (2006.01)
*G06N 99/00* (2010.01)
*G06N 5/02* (2006.01)

(52) U.S. Cl.
CPC ............... *G06N 99/005* (2013.01); *G06N 5/02* (2013.01)

(58) Field of Classification Search
None
See application file for complete search history.

(56) References Cited

U.S. PATENT DOCUMENTS

| 7,558,778 | B2 | 7/2009 | Carus et al. |
| 7,570,816 | B2 | 8/2009 | Bargeron et al. |
| 7,970,766 | B1 * | 6/2011 | Shamsi et al. ............... 707/737 |
| 7,996,440 | B2 | 8/2011 | Probst et al. |
| 8,073,877 | B2 | 12/2011 | Irmak et al. |
| 8,112,402 | B2 | 2/2012 | Cucerzan et al. |
| 8,190,538 | B2 * | 5/2012 | Zhang et al. .................... 706/12 |
| 8,370,128 | B2 * | 2/2013 | Brun et al. ........................ 704/9 |
| 8,374,844 | B2 * | 2/2013 | Brun et al. ........................ 704/9 |
| 8,805,845 | B1 * | 8/2014 | Li et al. .......................... 707/738 |
| 2003/0004932 | A1 * | 1/2003 | Chow et al. ....................... 707/3 |
| 2007/0112833 | A1 * | 5/2007 | Angell et al. .................. 707/102 |
| 2008/0228769 | A1 * | 9/2008 | Lita et al. .......................... 707/6 |
| 2009/0144609 | A1 | 6/2009 | Liang et al. |
| 2010/0082331 | A1 | 4/2010 | Brun et al. |
| 2011/0103682 | A1 * | 5/2011 | Chidlovskii et al. .......... 382/159 |
| 2012/0117092 | A1 | 5/2012 | Stankiewicz et al. |
| 2013/0159277 | A1 * | 6/2013 | Liu et al. ....................... 707/709 |

(Continued)

OTHER PUBLICATIONS

He et al., "Prospective Client Driven Technology Recommendation", Jul. 2012, Annual SRII Global Conference, pp. 110-119.*

(Continued)

*Primary Examiner* — Alan Chen
*Assistant Examiner* — Paulinho E Smith
(74) *Attorney, Agent, or Firm* — Cantor Colburn LLP

(57) ABSTRACT

According to one embodiment, a semi-supervised data integration model for named entity classification from a first repository of entity information in view of an auxiliary repository of classification assistance data is provided. Training data are compared to named entity candidates taken from the first repository to form a positive training seed set. A decision tree is populated and classification rules are created for classifying the named entity candidates. A number of entities are sampled from the named entity candidates. The sampled entities are labeled as positive examples and/or negative examples. The positive training seed set is updated to include identified commonality between the positive examples and the auxiliary repository. A negative training seed set is updated to include negative examples which lack commonality with the auxiliary repository. In view of both the updated positive and negative training seed sets, the decision tree and the classification rules are updated.

20 Claims, 6 Drawing Sheets

(56) References Cited

U.S. PATENT DOCUMENTS

2014/0172754 A1* 6/2014 He et al. .......................... 706/12
2014/0195471 A1* 7/2014 Chen et al. ...................... 706/46

OTHER PUBLICATIONS

David Nadeau, "Semi-Supervised Named Entity Recognition: Learning to Recognize 100 Entity Types with Little Supervision", 2007, pp. 1-150.*

Y. Li, et al., "Enhancing biomedical named entity classification using terabytre unlabeled data," In Proceedings of the 4th Asia information retrieval conference on information retrieval technology, 2008, 14 pages.

D.E. Johnson, et al., "A decision-tree-based symbolic rule induction system for text categorization," IBM Systems Journal, 41(3):428-437, 2002.

D. Nadeau, et al., "A survey of named entity recognition and classification," Lingvisticae Investigationes, 30(1):3-26, Jan. 2007, 20 pages.

A. Carlson, et al., "Coupled Semi-Supervised Learning for Information Extraction," WSDM'10, Feb. 4-6, 2010, 10 pages.

Y. Ni, et al., "Enhancing the Open-Domain Classification of Names Entity using Linked Open Data," In Proceedings of the 9th International Semantic Web Conference on The Semantic Web, 2010, 16 pages.

M. Dredze, et al., "Entity Disambiguation for Knowledge Base Population," In Proceedings of the 23rd International Confence on Computational Linguistics, 2010, 9 pages.

W. Cohen, et al., "Exploiting Dictionaries in Named Entity Extraction: Combining Semi-Markov Extraction Processes and Data Integration Methods," In Proceedings of the 10th ACM SIGKDD International Conference on Knowledge discovery and data mining, 2004, 10 pages.

S. Cucerzan, "Large-Scale Named Entity Disambiguation Based on Wikipedia Data," In Proceedings of EMNLP-CoNLL 2007, 2007, 9 pages.

E. Riloff, et al., "Learning Dictionaries for Information Extraction by Multi-Level Bootstrapping," In Proceedings of the Sixteenth National Conference on Artificial Intelligence (AAAI-99) 1999, 6 pages.

D. Downey, et al. "Locating Complex Named Entities in Web Text," In Proc. of IJCAI, 2007, 7 pages.

S. Spangler, et al., "Modeling Document Taxonomies," IBM Research, Almaden Research Center, 2002, 9 pages.

G. Wang, et al., "PORE: Positive-Only Relation Extraction from Wikipedia Text," ISWC 2007, 14 pages.

Q. He, et al. "Prospective Client Driven Technology Recommendation," 2012 Annual SRI! Global Conference, Jul. 2012, pp. 110-119.

Y. Sari, et al., "Rule-based pattern extractor and named entity recognition: A hybrid approach," 2010 International Symposium in Information Technology (ITSM), vol. 2, 6 pages.

S. Spangler, et al., "SIMPLE: Interactive Analytics on Patent Data," 2010 IEEE International Conference on Data Mining Workshops, pp. 426-433.

G. Salton, et al., "Term-weighting approaches in automatic text retrieval," Information Processing and Management, 4 (5):512-523, 1988, 23 pages.

M. Collins, et al., "Unsupervised Models for Named Entity Classification," In Proceedings of the Joint Sigdat Conference on Empirical Methods in Natual Language Processing and Very Large Corpora, 1999, 11 pages.

O. Etzioni, et al., "Unsupervised Named-Entity Extraction from the Web: An Experimental Study," An Experimental study. Artifical Intelligence, 165:91-134, 2005, 44 pages.

C. Whitelaw, et al., "Web-Scale Named Entity Recognition," In Proceedings of the 17th ACM Conference on Information and Knowledge Management, 2008, 10 pages.

* cited by examiner

SEMI-SUPERVISED DATA INTEGRATION MODEL FOR NAMED ENTITY CLASSIFICATION

BACKGROUND

The present disclosure relates generally to information extraction, and more specifically, to a semi-supervised data integration model for named entity classification.

Named entity recognition and classification are important aspects of information extraction to identify information units such as people, organizations, location names, and numeric expressions for time, money and numbers from unstructured text. Typically, information units or numeric expressions are first extracted out as named entities from the unstructured text (i.e., named entity recognition), followed by learning a function from an entity to its type, which is selected from predefined categories such as: People, Organizations, Locations, Products, Genes, Compounds, and Technologies, etc. (i.e., named entity classification).

A learning method hinging upon recognition and classification rules is important to named entity recognition; however, performing classification using handcrafted rules is not scalable as a corpus to classify grows. There are several kinds of learning methods depending on the availability of training examples. Supervised learning methods infer rules from positive and negative examples of named entities over a large collection of annotated documents for each entity type. Supervised learning requires a large annotated corpus and thus is impractical where manually generated labels are not available or are difficult to generate. Unsupervised learning methods apply clustering technology to automatically gather entities from clusters. Unsupervised learning suffers from randomization of clustering and is sensitive to outliers in the data. More commonly, there only exists a small set of training seeds for starting the learning process. A semi-supervised learning system accumulates new rules from newly classified positive and negative examples at a rapidly accelerating rate and applies these rules to unlabeled data iteratively. Semi-supervised learning typically deteriorates rapidly when noise is introduced in the data, causing problems related to selection of unlabeled data for each round of re-training

BRIEF SUMMARY

According to one embodiment, a method for a semi-supervised data integration model for named entity classification from a first repository of entity information in view of an auxiliary repository of classification assistance data is provided. Training data are compared to named entity candidates taken from the first repository, thereby forming a positive training seed set in view of identified commonality between the training data and the named entity candidates. In view of the positive training seed set, a decision tree is populated and classification rules are created for classifying the named entity candidates. A number of entities are sampled from the named entity candidates. In view of the classification rules, the sampled entities are labeled as positive examples and/or negative examples. In view of the positive examples and the auxiliary repository, the positive training seed set is updated to include identified commonality between the positive examples and the auxiliary repository. In view of the negative examples and the auxiliary repository, a negative training seed set is updated to include negative examples which lack commonality with the auxiliary repository. In view of both the updated positive and negative training seed sets, the decision tree and the classification rules are updated.

Additional exemplary embodiments include a computer program product for providing a semi-supervised data integration model for named entity classification from a first repository of entity information in view of an auxiliary repository of classification assistance data. The computer program product includes a computer readable storage medium having computer readable program code embodied therewith, the computer readable program code being executable by a computer to perform a method. The method includes comparing training data to named entity candidates taken from the first repository, thereby forming a positive training seed set in view of identified commonality between the training data and the named entity candidates. In view of the positive training seed set, a decision tree is populated and classification rules are created for classifying the named entity candidates. A number of entities are sampled from the named entity candidates. In view of the classification rules, the sampled entities are labeled as positive examples and/or negative examples. In view of the positive examples and the auxiliary repository, the positive training seed set is updated to include identified commonality between the positive examples and the auxiliary repository. In view of the negative examples and the auxiliary repository, a negative training seed set is updated to include negative examples which lack commonality with the auxiliary repository. In view of both the updated positive and negative training seed sets, the decision tree and the classification rules are updated.

Further exemplary embodiments include a system for providing a semi-supervised data integration model for named entity classification from a first repository of entity information in view of an auxiliary repository of classification assistance data. The system includes memory having computer readable computer instructions and a processor for executing the computer readable instructions to perform a method. The method includes comparing training data to named entity candidates taken from the first repository, thereby forming a positive training seed set in view of identified commonality between the training data and the named entity candidates. In view of the positive training seed set, a decision tree is populated and classification rules are created for classifying the named entity candidates. A number of entities are sampled from the named entity candidates. In view of the classification rules, the sampled entities are labeled as positive examples and/or negative examples. In view of the positive examples and the auxiliary repository, the positive training seed set is updated to include identified commonality between the positive examples and the auxiliary repository. In view of the negative examples and the auxiliary repository, a negative training seed set is updated to include negative examples which lack commonality with the auxiliary repository. In view of both the updated positive and negative training seed sets, the decision tree and the classification rules are updated.

Exemplary embodiments also include a method for providing a semi-supervised data integration model for named entity classification from a first repository of entity information in view of an auxiliary repository of classification assistance data. Training data are compared to named entity candidates taken from the first repository, thereby forming a positive training seed set in view of identified commonality between the training data and the named entity candidates. In view of the positive training seed set, classification rules are created for classifying the named entity candidates. A number of entities are sampled from the named entity candidates. In view of the classification rules, the sampled entities are labeled as positive examples and/or negative examples. In view of the positive examples and the auxiliary repository, the positive training seed set is updated to include identified commonality between the positive examples and the auxiliary repository. In view of the negative examples and the auxiliary repository, a negative training seed set is updated to include negative examples which lack commonality with the auxiliary repository. In view of both the updated positive and negative training seed sets, the classification rules are updated. A change in a number of rules is determined between the classification rules and the updated classification rules. The sampling, the labeling of the sampled entities, the updating of the positive and negative training seed sets, and the updating of the classification rules are repeated until the change in the number of rules between iterations is less than a threshold amount. The updated classification rules are applied to the named entity candidates to produce a set of classified named entities.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to providing a semi-supervised data integration model for named entity classification. Multiple data sources are leveraged as knowledge bases (i.e., repositories) for the selection of unlabeled data for a semi-supervised named entity classifier. Data in a question knowledge base can be classified into predefined entity types by integrating other data sources in a semi-supervised manner. The question knowledge base is a repository of entity information. As a pre-processing step, a small entity seed list that can be manipulated by hand as training data are selected along with other knowledge bases to classify the question knowledge base. The training data are mapped to the question knowledge base to form a positive training seed set. The mapping compares the training data to named entity candidates taken from the question knowledge base, thereby forming the positive training seed set in view of identified commonality between the training data and the named entity candidates. A decision tree is learned from the positive training seed set and classification rules are induced (i.e., created) from the decision tree. Entities are sampled from the question knowledge base, labeled using the induced classification rules, and split into new positive and negative examples. New positive and negative training seed sets are formed based on existing training seed sets, the new positive and negative examples, and an auxiliary knowledge base. The auxiliary knowledge base is an auxiliary repository of classification assistance data. A new set of classification rules is induced from the new positive and negative training seed sets. The process continues until a threshold condition is met, resulting in a final set of classification rules. The final set of classification rules can be applied to the question knowledge base to produce classified named entity sets, and the process is repeated to support multiple named entity types.

Figure 1:
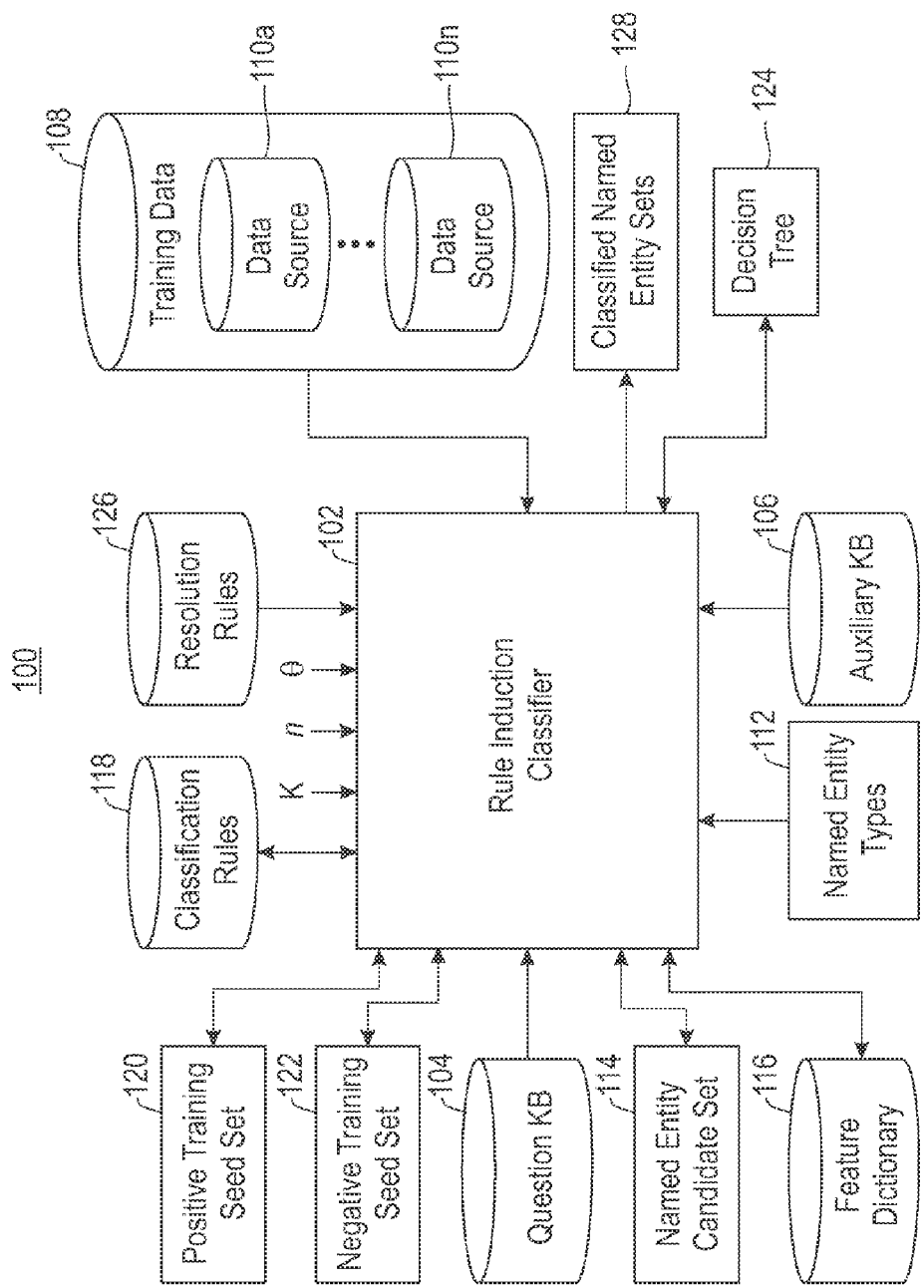
FIG. 1 depicts a system for providing a semi-supervised data integration model for named entity classification in accordance with an embodiment.

Turning now to FIG. 1, a rule induction classifier 102 can be implemented in a computer system 100 to provide a semi-supervised data integration model for named entity classification. In exemplary embodiments, the rule induction classifier 102 interacts with a number of elements, including a question knowledge base 104, an auxiliary knowledge base 106, and training data 108 including a plurality of data sources 110a-110n for a plurality of named entity types 112. The question knowledge base 104 is a first or primary repository of entity information, and the auxiliary knowledge base 106 is an auxiliary repository of classification assistance data. The rule induction classifier 102 can extract a named entity candidate set 114 from the question knowledge base 104 to remove aliases and further condense named entity candidates for classification. For example, the question knowledge base 104 may be an electronic encyclopedia including millions of articles, such as Wikipedia, that contains multiple titles that map to a common article. The auxiliary knowledge base 106 can also be pre-processed to filter false positives from positive examples. For example, the auxiliary knowledge base 106 can be a collection of millions of US and foreign patents and publications with assignees extracted for Company classification and higher frequency bigrams (i.e., two adjacent elements) and trigrams (i.e., three adjacent elements) extracted from titles and abstracts for Technology classification. Each named entity type for classification in the named entity types 112 can have an associated data source 110 in the training data 108 that provides an initial truth of positive examples. For example, a list of several thousand international companies with substantial revenues (e.g., >500 million USD) can form one of the data sources 110a-110n for Company classification, while an existing taxonomy of several thousand terms (e.g., IEEE taxonomy of terms) can form one of the data sources 110a-110n for Technology classification.

For each entity type in the named entity types 112, the rule induction classifier 102 learns a function from the named entity candidate set 114 of the question knowledge base 104 to form a set of two classes, $C_i$ and not $C_i$, where each entity type has a different value of i, based on the auxiliary knowledge base 106 and the training data 108. Each named entity candidate in the named entity candidate set 114 includes a collection of words, such as an article, from which features are extracted for classifier training. Since an article may include a number of features such as an information box, headers, category tags, figures, tables, and vision tags, these features may be removed or ignored during feature extraction, leaving a main body of text description. While some tags or an information box in an article could be useful for classification, these features may not be universally available in question knowledge bases, and as such, can be used or ignored by the rule induction classifier 102. Candidate entity content in the named entity candidate set 114, such as articles, can be further processed to eliminate common stop words and (high- and low-frequency) non-content-bearing words, selecting only the N most frequently occurring words to include in a feature dictionary 116. Based on the feature dictionary 116, candidate entity content can be represented as a vector space model applying weights to each word of the feature dictionary 116 in the candidate entity content of the named entity candidate set 114. A known term weighting approach for text retrieval can be used as a weighting scheme to compute each weight.

The rule induction classifier 102 applies a semi-supervised learning framework for named entity classification. A small initial set of training seeds in training data 108 provides ground truth data used to learn some starting classification rules $R_0$ in classification rules 118. The starting training seeds of the training data 108 can be arbitrarily small so that it can be manipulated with minimal manual effort and serve as a gold-standard for the classification rules 118. For example, the training data 108 may include several orders of magnitude less of data values than the auxiliary knowledge base 106. The starting classification rules $R_0$ may be insufficient to represent patterns of a targeted named entity class. For instance, suppose R is the optimal set of rules to learn in an ideal setting. The rule induction classifier 102 gradually optimizes the classification rules 118 from $R_0$ so that it can eventually approach R after k iterations of bootstrap learning. For each bootstrap-learning iteration no more ground truth data is available, but knowledge from other data sources, such as the auxiliary knowledge base 106, as well as previously learned rules can be leveraged to further refine the classification rules 118.

In exemplary embodiments, the rule induction classifier 102 receives parameters K, n, and θ. Parameter K is used to control the maximum number of iterations for inducing new training data (new rules). Parameter n is the number of testing entities in the named entity candidate set 114 to sample for each of the iterations. Parameter θ provides a threshold to terminate inducing new rules before reaching K based on a low relative growth rate of the classification rules 118 (e.g., zero growth rate of the classification rules 118 between iterations). As further described herein, the rule induction classifier 102 develops a positive training seed set 120 and a negative training seed set 122 from which a decision tree 124 is learned. The classification rules 118 are updated based on the decision tree 124, and the decision tree 124 is updated based on an intersection of positive and negative examples from the named entity candidate set 114 with the auxiliary knowledge base 106. Resolution rules 126 can be applied when mapping data values to determine an intersection between data sets that extend beyond an exact match. When the classification rules 118 are finalized, the rule induction classifier 102 can apply the classification rules 118 to the named entity candidate set 114 of the question knowledge base 104 to produce classified named entity sets 128 for each of the named entity types 112. Further details are provided herein.

The resolution rules 126 support relating named entities that appear in the different knowledge bases or repositories. Specifically, the resolution rules 126 determine where one named entity from one knowledge base refers to the same named entity from another knowledge base, such as the question knowledge base 104 and the auxiliary knowledge base 106, as well as the training data 108. This is referred to as named entity resolution. Examples of resolution rules 126 include determining whether:

1. Two names exactly match each other.
2. One name wholly contains the other name (e.g., International Business Machines and International Business Machines Corporation).
3. One name is an acronym of another name (e.g., IBM and International Business Machines).
4. One name is an alias of another name in a knowledge base (e.g., ibm.com is an alias of IBM in the question knowledge base 104 by linking to the same article, and Armonk Business Machines Corporation is an alias of IBM in a patent corpus of a data source 110 by sharing the same patent assignee code).
5. Two names are very similar in terms of edit distance and term-based vector space cosine similarity. It may be risky to conclude that two names are the same if any single similarity score is above some threshold. For example, the edit distance of SON and SONY is only one, but they indeed represent different companies. Given two names $x_i$ and $x_j$, $A(x_i)$ and $A(x_j)$ are the alias set of each name. If a name $x_i$ does not have other aliases, $A(x_i)=x_i$. The following two similarities can be computed:

edit distance (ed):

$$\frac{1}{\max(len(a), len(b))} \mathrm{argmin}_{ed} ed(a, b), a \in A(x_i), b \in A(x_j).$$

term-based vector space cosine similarity (cos), term frequency inverted document frequency (TF-IDF) weighting:

$$\arg\max\nolimits_{cos} \cos(a,b), a \in A(x_i), b \in A(x_j).$$

Only when the edit distance is less than a threshold (e.g., 0.25), and the cosine similarity is above a threshold (e.g., 0.9), these two named entities are determined to be the same. For example, "Intenational Business Machines" is a typo of "International Business Machines" with a low edit distance and a high cosine similarity. They are grouped as the same named entity.

Figure 2A:
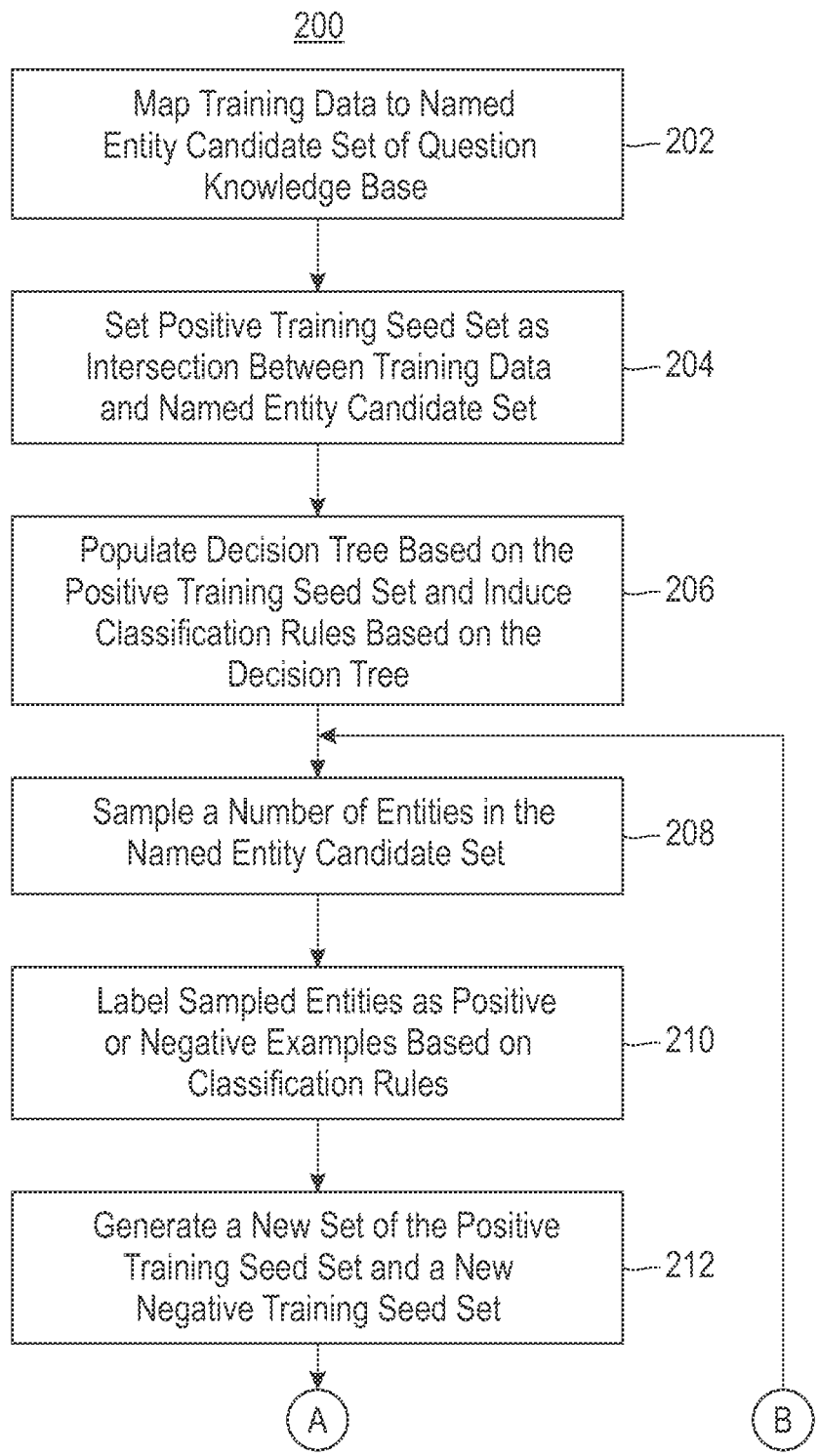
FIGS. 2A and 2B depict a process flow for providing a semi-supervised data integration model for named entity classification in accordance with an embodiment.
Figure 2B:
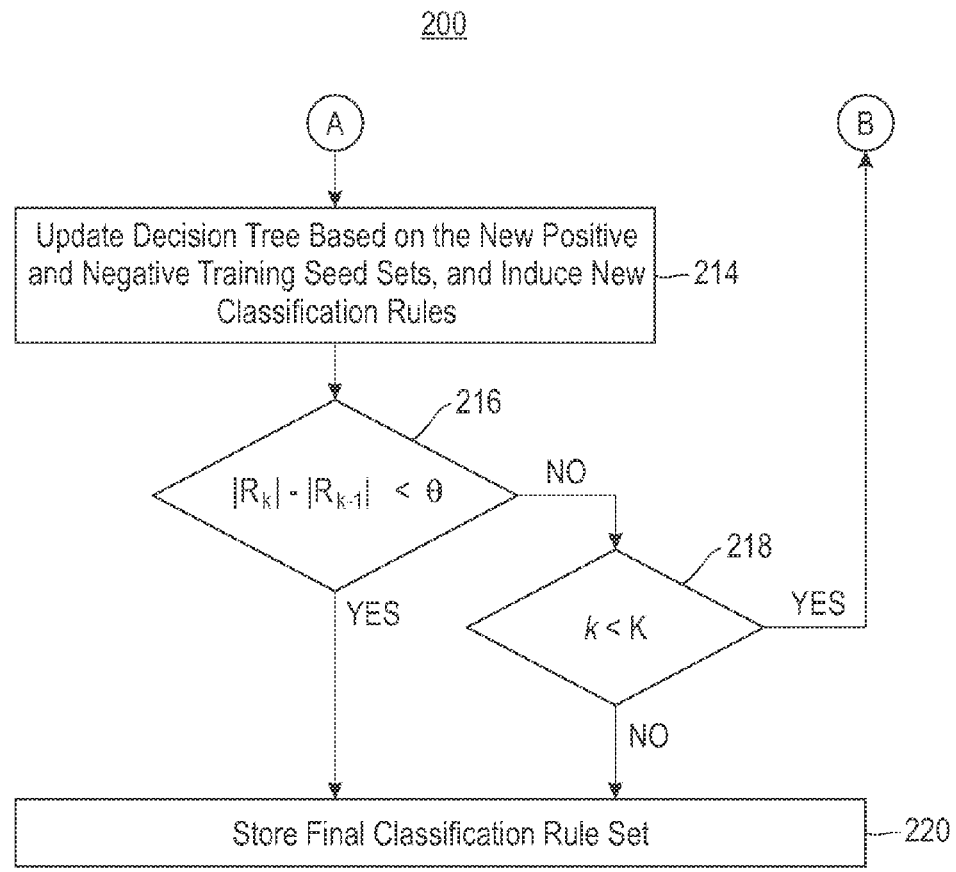

FIGS. 2A and 2B depict a process 200 for providing a semi-supervised data integration model for named entity classification in accordance with an embodiment. The process 200 can be implemented by the rule induction classifier 102 of FIG. 1 and is further described herein with reference to FIG. 1.

At block 202, the training data 108 are mapped to the named entity candidate set 114 of the question knowledge base 104. The mapping can use the resolution rules 126 to identify both exact matches and similar matches. The mapping compares training data 108 to named entity candidates of the named entity candidate set 114 taken from the question knowledge base 104, where the question knowledge base 104 is a repository of entity information.

At block 204, the positive training seed set 120 is established as the intersection between the training data 108 and the named entity candidate set 114 of the question knowledge base 104. Therefore, the positive training seed set 120 includes identified commonality between the training data 108 and the named entity candidates of the named entity candidate set 114. The negative training seed set 122 is initialized to a null value or empty set.

At block 206, the decision tree 124 is populated in view of the positive training seed set 120 and the negative training seed set 122. In view of populating the decision tree 124, the classification rules 118 are created for classifying the named entity candidates. A starting set of rules $R_0$ is induced from the decision tree 124 and stored in the classification rules 118.

At block 208, a number n of entities in the named entity candidate set 114 of the question knowledge base 104 is randomly sampled without replacement, where n is less than the total number of entities in the named entity candidate set 114.

At block 210, the n sampled entities are labeled as positive and/or negative examples in view of the classification rules 118. Examples where no rule applies are assigned to class not $C_i$ by default. The n sampled entities are split into two parts, positive examples and negative examples.

At block 212, a new set of the positive training seed set 120 is generated as a union of the positive training seed set 120 with an intersection of the positive examples and the auxiliary knowledge base 106. The positive training seed set 120 therefore includes identified commonality between the positive examples and the auxiliary knowledge base 106, where the auxiliary knowledge base 106 is an auxiliary repository of classification assistance data. A new set of negative training seed set 122 is generated as a union of the negative training seed set 122 with the negative examples minus an intersection of the negative examples and the auxiliary knowledge base 106. The negative training seed set 122 therefore includes negative examples which lack commonality with the auxiliary knowledge base 106. The resolution rules 126 can be used to identify both exact matches and similar matches.

At block 214, the decision tree 124 is updated based on the new positive and negative training seed sets 120 and 122. A new set of rules $R_k$ is created/induced from the decision tree 124 and written to the classification rules 118.

At block 216, it is determined whether a change in the number of rules in the new set of rules $R_k$ relative to the number of rules in the previous set of rules $R_{k-1}$ is less than the threshold value $\theta$. If so, then the process 200 ends at block 220; otherwise, the process 200 continues to block 218.

At block 218, if fewer than K iterations have been completed, then k is incremented and the process returns to block 208; otherwise, the process 200 ends at block 220.

At block 220, upon completing the process 200, the rule set $R_k$ stored in the classification rules 118 is the final classification rule set for applying to the named entity candidate set 114 of the question knowledge base 104 and producing the classified named entity sets 128.

In one example, an experiment was performed to quantitatively monitor the evolution of the number of classification rules 118 induced by the rule induction classifier 102 to produce classification result for each of the named entity types 112 respectively. Parameters were set as n=10,000, K=100 and $\theta$=5. For entity type $C_1$ of Company, the number of induced classification rules quickly converged to about forty-six after five iterations, largely less than the threshold 100, validating the efficiency of the rule induction classifier 102. Accuracy of classification can be verified experimentally using a known ground truth in the question knowledge base 104 and analyzing precision, recall, F1-score on multiple iterations, where F1-score is known in the art of statistics as a measure of a test's accuracy. The final classifier model captured in the classification rules 118 of the entity type can be evaluated back on the training data 108 to make sure that it still fits the initial ground truth of the training data 108. A confidence score calculated on the classification accuracy can also be determined to verify the effectiveness of the process. Ranking unique named entities according to classification confidence scores by setting a confidence score threshold filters out noise in the results and increases estimated precision.

Figure 3:
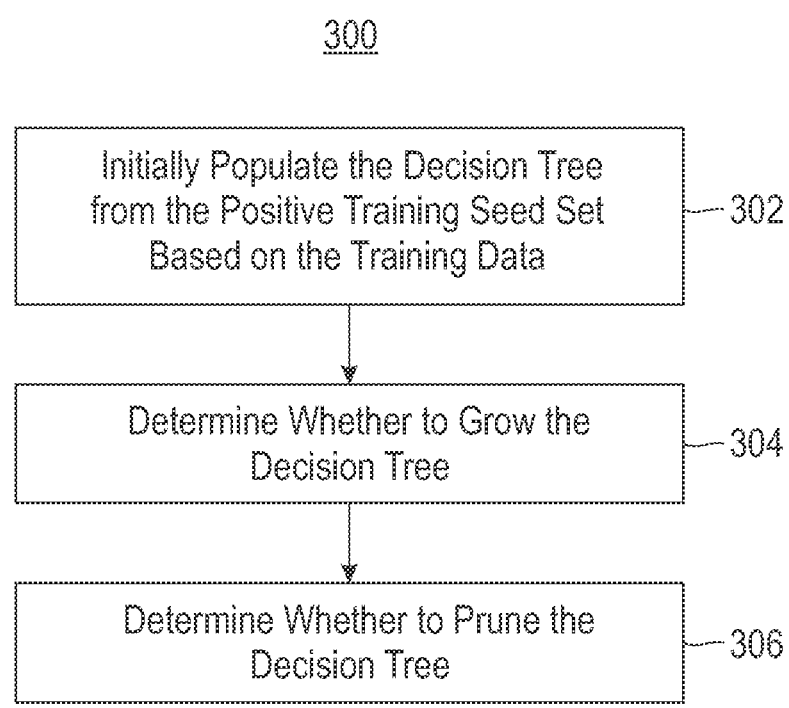
FIG. 3 depicts a process flow for decision tree learning in accordance with an embodiment.

FIG. 3 depicts a process 300 for decision tree learning in accordance with an embodiment. In an exemplary embodiment, the process 300 is applied by the rule induction classifier 102 to learn the decision tree 124 of FIG. 1. The decision tree 124 is learned from the training data 108 and corresponding classification rules 118 are created/induced from the decision tree 124. After the decision tree 124 grows fully, each path from the root to a leaf node corresponds to a classification rule. The number of classification rules 118 equals the number of leaf nodes in the decision tree 124. Growth of the decision tree 124 can be limited, and the decision tree 124 can be pruned as more data are available to the decision tree 124.

At block 302, the decision tree 124 is initially populated from the positive training seed set 120 in view of the training data 108. At block 304, in view of updates to the positive training seed set 120 and the negative training seed set 122, the rule induction classifier 102 determines whether to grow the decision tree 124 by splitting one or more tree nodes into child nodes. At block 306, the rule induction classifier 102 determines whether to prune the decision tree 124 to remove child nodes that lack a meaningful distinction between them.

Given any internal node in the decision tree 124 (starting from the root node that contains all training data T for the entity type) that contains a subset of training data, F, the task of decision tree growing is to make a decision of splitting this node into two child nodes or not, based on some feature $f \in F$ and its value v:

$$\Gamma \to \Gamma_{f,v}^1 \cup \Gamma_{f,v}^2,$$

$$\Gamma_{f,v}^1 = \{x_i \in \Gamma, x_{i,f} \leq v\} \text{ and } \Gamma_{f,v}^2 = \{x_i \in \Gamma, x_{i,f} > v\}.$$

Suppose (f, v)-split is the best split (search over all combinations of features and their values) that minimizes the cost associated with this split. If the cost is less than a threshold, the split is made to grow the tree; otherwise, tree growing stops for this internal node, which becomes a leaf node of the tree. The cost is defined as:

$$Q(f,v) = p_{f,v} g(p_{f,v}^1) + (1 - p_{f,v}) g(p_{f,v}^2),$$

where $g(\cdot)$ is an entropy function and $p_{f,v}$ is the data distribution probability—the overall proportion of training data that has the f feature value $\leq$v. $p_{f,v}^1 = p(y_i = 1 | x_i \in \Gamma_{f,v}^1)$ and $p_{f,v}^2 = p(y_i = 1 | x_i \in \Gamma_{f,v}^2)$ represent the probabilities that data in $\Gamma_{f,v}^1$ or $\Gamma_{f,v}^2$ are positive examples. If both $p_{f,v}^1$ and $p_{f,v}^2$ are 0.5, the cost is maximized since the split results in a random guess. If both are very small (close to 0) or very high (close to 1), this split is meaningless as the parent node $\Gamma$ is already differentiable enough. An effective split is where one probability is relatively high and the other is relatively small.

As more and more training data arrive, a fully grown tree will become more and more complicated. Due to the existence of noise in the data, it cannot be guaranteed that newly arriving data will always follow existing paths of the previous learned tree, or the possibility of a new path will become smaller and smaller. Thus, the number of classification rules 118 in the future is unpredictable. One effective solution is to prune the decision tree 124 so that the noise data will be smoothed. Without the side-effect of noisy data, as more and more training data are available, the increment of the number of rules will become smaller and smaller because globally, the pattern characteristics of any class is limited.

To prune the decision tree, two scores $r(\Gamma_1)$ and $r(\Gamma_2)$ are assigned to two child nodes $\Gamma_1$ and $\Gamma_2$ of an internal node $\Gamma$, respectively. The score $r(\Gamma_i)$ manifests the preference of child i to a given class. If both scores are larger than 0.5 simultaneously, indicating both child nodes are inclined to the same class, then the split is not meaningful. In this case, the two child nodes are removed. The score $r(\Gamma_i)$ is defined as:

$$r(\Gamma_i) = r(\Gamma) + \hat{\omega}_{\Gamma_i} \omega_{\Gamma_i} p(\Gamma_i).$$

If the parent node has already inclined to a class ($r(\Gamma)$ is high), it is meaningless to further split the parent node. Suppose the situation at the parent node is unclear ($r(\Gamma)$ is small), $r(\Gamma_i)$ depends on the remaining three factors: $\omega_{\Gamma_i}$, $\omega_{\Gamma_i}$ and $p(\Gamma_i)$.

$\hat{\omega}_{\Gamma_i}\omega_{\Gamma_i}$ collectively measures the importance ranging from [0, 1] of child $\Gamma_i$ with respect to the decision tree 124. If $\Gamma_i$ is more differentiable and its own child nodes are less differentiable, the score of $\omega_{\Gamma_i}$ is larger. If $\Gamma_i$ is more differentiable and its ancestors are less differentiable, the score of $\hat{\omega}_{\Gamma_i}$ is larger. In general, $\hat{\omega}_{\Gamma_i}\omega_{\Gamma_i}$ is larger, indicating the child $r(\Gamma_i)$ is less trivial (with moderate size and reasonable class distinguishing ability). $p(\Gamma_i)$ represents the probability that data in $\Gamma_i$ are in a given class (either positive or negative). This probability directly measures the data distribution of child i to a given class.

While learning the decision tree 124 over multiple iterations using the semi-supervised learning method of the rule induction classifier 102, each of the iterations includes randomly sampling n entities of the named entity candidate set 114 as $E_k$ to induce new training data. The class distribution of $E_k$ roughly follows the prior probability of the class in the question knowledge base 104, which can be extremely unbalanced. Therefore, if both child nodes originally incline to the negative class, as the semi-supervised learning proceeds, the increment speeds of both $p(\Gamma_1)$ and $p(\Gamma_2)$ become larger and larger with respect to the negative class. Both values would quickly reach the threshold 0.5 so that the corresponding two child nodes would be pruned. If both child nodes originally incline to the positive class or one child node originally inclines to the positive class and the other child node originally inclines to the negative class, the extremely unbalanced new training data $E_k$ tends to make this split more meaningful and thus does not significantly affect the number of rules.

Figure 4:
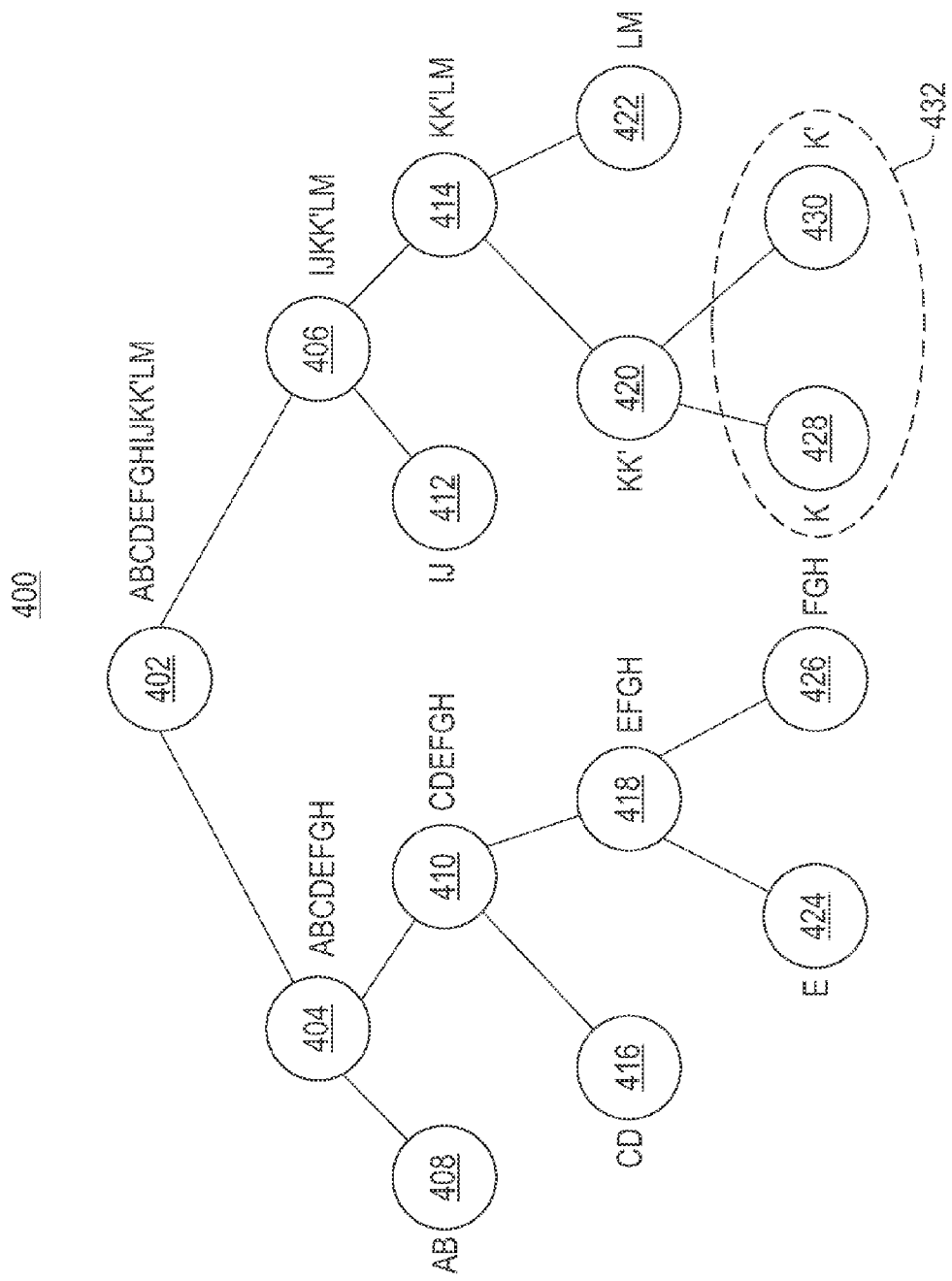
FIG. 4 depicts an example decision tree in accordance with an embodiment.

FIG. 4 depicts an example decision tree 400 in accordance with an embodiment. The decision tree 400 represents a simplified example of the decision tree 124 of FIG. 1. The decision tree 400 includes a root node 402 having training data of ABCDEFGHIJKK'LM and child nodes 404 and 406. Node 404 has training data of ABCDEFGH that is a subset of root node 402. Node 406 has training data of IJKK'LM that is a subset of root node 402. Node 404 has child nodes 408 and 410, where node 408 has training data of AB and node 410 has training data of CDEFGH. Node 406 has child nodes 412 and 414, where node 412 has training data of IJ and node 414 has training data of KK'LM. Node 410 has child nodes 416 and 418, where node 416 has training data of CD and node 418 has training data of EFGH. Node 414 has child nodes 420 and 422, where node 420 has training data of KK' and node 422 has training data of LM. Node 418 has child nodes 424 and 426, where node 424 has training data of E and node 426 has training data of FGH. Node 420 has child nodes 428 and 430, where node 428 has training data of K and node 430 has training data of K'. In this example, the decision tree 400 grows when training data are added. When training datum H is added, it may be determined according to the block 304 of process 300 of FIG. 3 that no further split is needed with respect to values FG in node 426, thus limiting growth of the tree. According to block 306 of process 300 of FIG. 3, during pruning, it may be determined that values K and K' in nodes 428 and 430 are not sufficiently different and form a common class 432 such the nodes 428 and 430 can be removed in favor of parent node 420. Upon pruning, nodes 408, 412, 416, 420, 422, 424, and 426 remain as leaf nodes such that there are seven classification rules formed by the decision tree 400.

Figure 5:
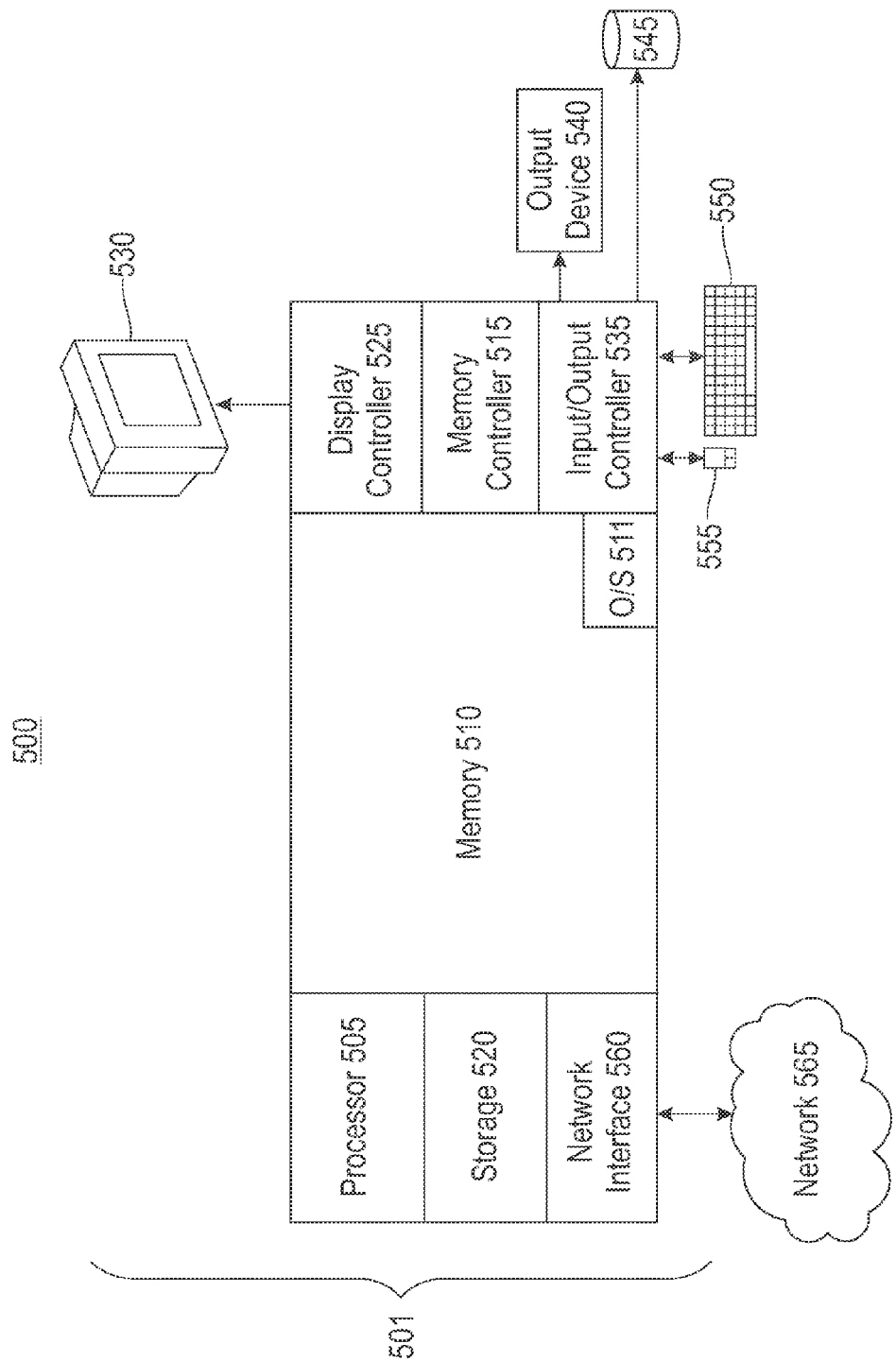
FIG. 5 depicts a computer system for providing a semi-supervised data integration model for named entity classification in accordance with an embodiment.

FIG. 5 depicts a block diagram of a system 500 for providing a semi-supervised data integration model for named entity classification. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore includes general-purpose computer 501 as illustrated in FIG. 5.

In an exemplary embodiment, in terms of hardware architecture, as shown in FIG. 5, the computer 501 includes a processor 505 to execute the rule induction classifier 102 of FIG. 1 and associated processes. The computer 501 further includes memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to fetch and execute instructions stored within the memory 510, to communicate data to and from the memory 510, and to generally control operations of the computer 501 pursuant to the instructions. The various elements of FIG. 1 can reside locally within the memory 510, can be accessed remotely via the network 565, or can be distributed locally and remotely.

In an exemplary embodiment, where the rule induction classifier 102 is implemented in hardware, the methods described herein, such as processes 200 and 300 of FIGS. 2 and 3, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The rule induction classifier 102 can be distributed into multiple functions that can be further distributed in a combination of hardware and software.

Technical effects and benefits include providing a semi-supervised data integration model for named entity classification. The semi-supervised approach to named entity classification as described herein provides a scalable solution with minimal manual modifications while providing high accuracy and resilience to noisy data.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing a semi-supervised data integration model for named entity classification from a first repository of entity information in view of an auxiliary repository of classification assistance data, the method comprising:
   comparing training data to named entity candidates taken from the first repository, thereby forming a positive training seed set in view of identified commonality between the training data and the named entity candidates;
   in view of the positive training seed set, populating a decision tree;
   in view of populating the decision tree, creating classification rules for classifying the named entity candidates;
   sampling a number of entities from the named entity candidates;
   in view of the classification rules, labeling the sampled entities as positive examples and/or negative examples;
   in view of the positive examples and the auxiliary repository, updating the positive training seed set to include identified commonality between the positive examples and the auxiliary repository;
   in view of the negative examples and the auxiliary repository, updating a negative training seed set to include negative examples which lack commonality with the auxiliary repository; and
   in view of both the updated positive and negative training seed sets, updating the decision tree and the classification rules.

2. The method of claim 1, comprising:
   repeating the sampling, the labeling of the sampled entities, the updating of the positive and negative training seed sets, and the updating of the decision tree and the classification rules until a threshold condition is met, the threshold condition comprising one of: a maximum number of iterations and a change in a number of rules in the classification rules between iterations.

3. The method of claim 1, comprising:
   performing the method for each of a plurality of named entity types to determine the classification rules for each of the named entity types, wherein the training data comprise a plurality of data sources comprising only positive examples associated with each of the plurality of named entity types.

4. The method of claim 1, comprising:
   removing aliases from the first repository to determine the named entity candidates;
   eliminating common stop words and non-content-bearing words from candidate entity content of the named entity candidates;
   populating a feature dictionary in view of high frequency words in the candidate entity content of the named entity candidates; and
   representing the candidate entity content as a vector space model by applying weights to each word of the feature dictionary in the candidate entity content.

5. The method of claim 1, comprising:
   preprocessing the auxiliary repository to remove false positive examples.

6. The method of claim 1, comprising:
   applying a plurality of resolution rules to identify both exact matches and similar matches.

7. The method of claim 1, wherein the decision tree comprises a plurality of tree nodes, the method comprising:
   determining whether to grow the decision tree by splitting one or more of the tree nodes into child nodes; and
   determining whether to prune the decision tree to remove child nodes that lack a meaningful distinction between them.

8. A computer program product for providing a semi-supervised data integration model for named entity classification from a first repository of entity information in view of an auxiliary repository of classification assistance data, the computer program product comprising:

a non-transitory computer readable storage medium having computer readable program code embodied therewith, the computer readable program code being executable by a computer to perform a method comprising:

comparing training data to named entity candidates taken from the first repository, thereby forming a positive training seed set in view of identified commonality between the training data and the named entity candidates;

in view of the positive training seed set, populating a decision tree;

in view of populating the decision tree, creating classification rules for classifying the named entity candidates;

sampling a number of entities from the named entity candidates;

in view of the classification rules, labeling the sampled entities as positive examples and/or negative examples;

in view of the positive examples and the auxiliary repository, updating the positive training seed set to include identified commonality between the positive examples and the auxiliary repository;

in view of the negative examples and the auxiliary repository, updating a negative training seed set to include negative examples which lack commonality with the auxiliary repository; and in view of both the updated positive and negative training seed sets, updating the decision tree and the classification rules.

9. The computer program product of claim 8, comprising:
repeating the sampling, the labeling of the sampled entities, the updating of the positive and negative training seed sets, and the updating of the decision tree and the classification rules until a threshold condition is met, the threshold condition comprising one of: a maximum number of iterations and a change in a number of rules in the classification rules between iterations.

10. The computer program product of claim 8, comprising:
performing the method for each of a plurality of named entity types to determine the classification rules for each of the named entity types, wherein the training data comprise a plurality of data sources comprising only positive examples associated with each of the plurality of named entity types.

11. The computer program product of claim 8, comprising:
removing aliases from the first repository to determine the named entity candidates;
eliminating common stop words and non-content-bearing words from candidate entity content of the named entity candidates;
populating a feature dictionary in view of high frequency words in the candidate entity content of the named entity candidates;
representing the candidate entity content as a vector space model by applying weights to each word of the feature dictionary in the candidate entity content; and
preprocessing the auxiliary repository to remove false positive examples.

12. The computer program product of claim 8, comprising:
applying a plurality of resolution rules to identify both exact matches and similar matches.

13. The computer program product of claim 8, wherein the decision tree comprises a plurality of tree nodes, and the method further comprising:

determining whether to grow the decision tree by splitting one or more of the tree nodes into child nodes; and
determining whether to prune the decision tree to remove child nodes that lack a meaningful distinction between them.

14. A system for providing a semi-supervised data integration model for named entity classification from a first repository of entity information in view of an auxiliary repository of classification assistance data, the system comprising:
memory having computer readable computer instructions; and
a processor for executing the computer readable instructions to perform a method comprising:

comparing training data to named entity candidates taken from the first repository, thereby forming a positive training seed set in view of identified commonality between the training data and the named entity candidates;

in view of the positive training seed set, populating a decision tree;

in view of populating the decision tree, creating classification rules for classifying the named entity candidates;

sampling a number of entities from the named entity candidates;

in view of the classification rules, labeling the sampled entities as positive examples and/or negative examples;

in view of the positive examples and the auxiliary repository, updating the positive training seed set to include identified commonality between the positive examples and the auxiliary repository;

in view of the negative examples and the auxiliary repository, updating a negative training seed set to include negative examples which lack commonality with the auxiliary repository; and in view of both the updated positive and negative training seed sets, updating the decision tree and the classification rules.

15. The system of claim 14, comprising:
repeating the sampling, the labeling of the sampled entities, the updating of the positive and negative training seed sets, and the updating of the decision tree and the classification rules until a threshold condition is met, the threshold condition comprising one of: a maximum number of iterations and a change in a number of rules in the classification rules between iterations.

16. The system of claim 14, comprising:
performing the method for each of a plurality of named entity types to determine the classification rules for each of the named entity types, wherein the training data comprise a plurality of data sources comprising only positive examples associated with each of the plurality of named entity types.

17. The system of claim 14, comprising:
removing aliases from the first repository to determine the named entity candidates;
eliminating common stop words and non-content-bearing words from candidate entity content of the named entity candidates;
populating a feature dictionary in view of high frequency words in the candidate entity content of the named entity candidates;
representing the candidate entity content as a vector space model by applying weights to each word of the feature dictionary in the candidate entity content; and preprocessing the auxiliary repository to remove false positive examples.

18. The system of claim 14, comprising:
applying a plurality of resolution rules to identify both exact matches and similar matches.

19. The system of claim 14, wherein the decision tree comprises a plurality of tree nodes, and the method further comprising:
determining whether to grow the decision tree by splitting one of more of the tree nodes into child nodes; and
determining whether to prune the decision tree to remove child nodes that lack a meaning distinction between them.

20. A method for providing a semi-supervised data integration model for named entity classification from a first repository of entity information in view of an auxiliary repository of classification assistance data, the method comprising:
comparing training data to named entity candidates taken from the first repository, thereby forming a positive training seed set in view of identified commonality between the training data and the named entity candidates;
in view of the positive training seed set, creating classification rules for classifying the named entity candidates;
sampling a number of entities from the named entity candidates;
in view of the classification rules, labeling the sampled entities as positive examples and/or negative examples;
in view of the positive examples and the auxiliary repository, updating the positive training seed set to include identified commonality between the positive examples and the auxiliary repository;
in view of the negative examples and the auxiliary repository, updating a negative training seed set to include negative examples which lack commonality with the auxiliary repository;
in view of both the updated positive and negative training seed sets, updating the classification rules;
determining a change in a number of rules between the classification rules and the updated classification rules;
repeating the sampling, the labeling of the sampled entities, the updating of the positive and negative training seed sets, and the updating of the classification rules until the change in the number of rules between iterations is less than a threshold amount; and
applying the updated classification rules to the named entity candidates to produce a set of classified named entities.

* * * * *